US 9,254,835 B2

(12) United States Patent
Harada et al.

(10) Patent No.: US 9,254,835 B2
(45) Date of Patent: Feb. 9, 2016

(54) HYBRID VEHICLE AND CONTROL METHOD THEREFOR

(71) Applicants: Taku Harada, Nisshin (JP); Masatoshi Ito, Okazaki (JP); Shohei Nagata, Nisshin (JP)

(72) Inventors: Taku Harada, Nisshin (JP); Masatoshi Ito, Okazaki (JP); Shohei Nagata, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 147 days.

(21) Appl. No.: 14/105,482

(22) Filed: Dec. 13, 2013

(65) Prior Publication Data

US 2014/0171257 A1    Jun. 19, 2014

(30) Foreign Application Priority Data

Dec. 18, 2012   (JP) .................. 2012-275900

(51) Int. Cl.
| | |
|---|---|
| *B60W 10/06* | (2006.01) |
| *B60W 10/08* | (2006.01) |
| *B60W 10/18* | (2012.01) |
| *F02D 17/02* | (2006.01) |
| *B60W 20/00* | (2006.01) |
| *B60K 6/445* | (2007.10) |
| *B60W 10/02* | (2006.01) |
| *B60K 6/38* | (2007.10) |

(52) U.S. Cl.
CPC ............... *B60W 20/10* (2013.01); *B60K 6/445* (2013.01); *B60W 10/02* (2013.01); *B60W 10/06* (2013.01); *B60W 10/08* (2013.01); *B60K 2006/381* (2013.01); *B60W 2510/087* (2013.01); *B60W 2710/088* (2013.01); *B60Y 2300/435* (2013.01); *Y02T 10/6239* (2013.01); *Y02T 10/6286* (2013.01); *Y10S 903/902* (2013.01); *Y10T 477/23* (2015.01)

(58) Field of Classification Search
CPC .................. B60Y 2300/435; B60W 2510/087; B60W 2510/06; F02D 17/02; F02D 17/023; F02D 17/026
USPC .......................................................... 475/5
See application file for complete search history.

(56) References Cited

U.S. PATENT DOCUMENTS

| | | | | |
|---|---|---|---|---|
| 6,886,649 | B2 * | 5/2005 | Wakashiro et al. | 180/65.26 |
| 7,470,209 | B2 * | 12/2008 | Holmes et al. | 477/3 |
| 2004/0035113 | A1 * | 2/2004 | Hanada et al. | 60/698 |
| 2007/0051350 | A1 * | 3/2007 | Pallet et al. | 123/688 |
| 2013/0283950 | A1 * | 10/2013 | Kobayashi et al. | 74/412 R |

FOREIGN PATENT DOCUMENTS

| | | |
|---|---|---|
| JP | 2002-271911 A | 9/2002 |
| JP | 2009-298199 A | 12/2009 |
| JP | 2011-088504 A | 5/2011 |
| JP | 2011-156984 A | 8/2011 |

* cited by examiner

*Primary Examiner* — Justin Holmes
*Assistant Examiner* — Stacey Fluhart
(74) *Attorney, Agent, or Firm* — Dinsmore & Shohl LLP

(57) ABSTRACT

In a hybrid vehicle, a criterion temperature for locking a first electric motor/generator is set to a first temperature when the engine is in a reduced-cylinder operation. The criterion temperature is set to a second temperature that is lower than the first temperature, when the engine is in an all-cylinder operation. If the temperature of the first electric motor/generator is higher than the criterion temperature, the first electric motor/generator is set to a locked state.

3 Claims, 3 Drawing Sheets

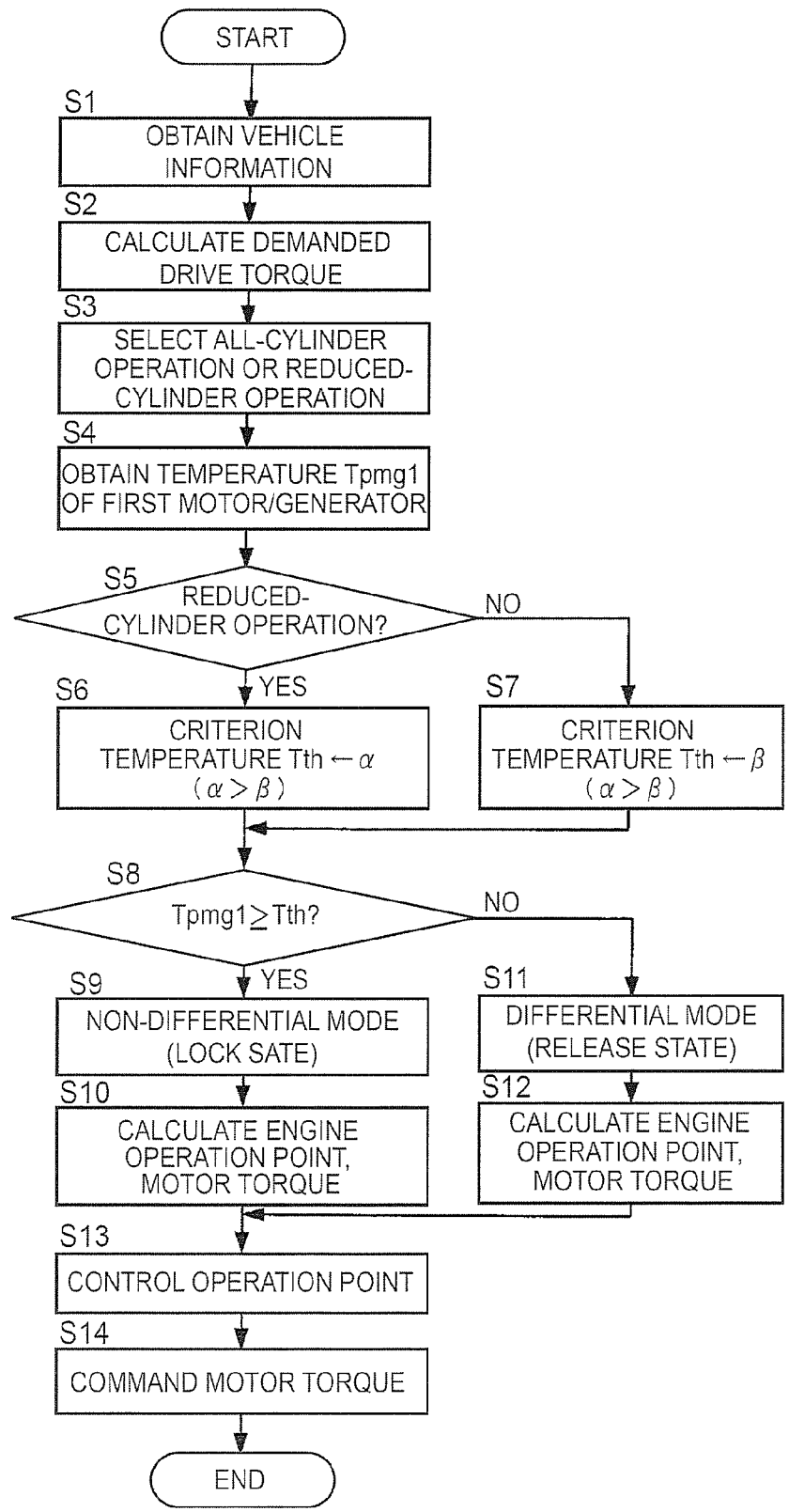

HYBRID VEHICLE AND CONTROL METHOD THEREFOR

INCORPORATION BY REFERENCE

The disclosure of Japanese Patent Application No. 2012-275900 filed on Dec. 18, 2012 including the specification, drawings and abstract is incorporated herein by reference in its entirety.

BACKGROUND OF THE INVENTION

1. Field of the Invention

The invention relates to a hybrid vehicle equipped with an engine and an electric motor/generator as propulsion power sources, and to a control method for the hybrid vehicle.

2. Description of Related Art

There is known a control apparatus that is applied to a hybrid vehicle capable of locking an electric motor/generator connected to a power splitting mechanism and that locks the electric motor/generator to restrain rises in the temperature of the electric motor/generator if the temperature of the electric motor/generator is higher than a predetermined criterion temperature (Japanese Patent Application Publication No. 2002-271911 (JP 2002-271911 A)).

In recent years, cylinder deactivation engines capable of deactivating one or more of a plurality of cylinders so as to improve the engine fuel economy have been developed. However, application of such a cylinder deactivation engine as an engine of a hybrid vehicle that is capable of locking an electric motor/generator has not been fully considered. In the control apparatus of JP 2002-271911 A, a temperature condition for locking an electric motor/generator is set merely on the assumption that the electric motor/generator is mounted in a hybrid vehicle equipped with an ordinary engine. Therefore, in the case where the control apparatus of JP 2002-271911 A is immediately applied to a hybrid vehicle equipped with a cylinder deactivation engine so that, with regard to the locking of the electric motor/generator, the same criterion is set for both the reduced-cylinder operation and the all-cylinder operation, a problem may possibility occur.

SUMMARY OF THE INVENTION

The invention provides a hybrid vehicle which is equipped with an engine that can be operated while one or more of a plurality of cylinders are deactivated and which is capable of locking an electric motor/generator, and a control method for the hybrid vehicle.

A control apparatus in a first aspect of the invention is a hybrid vehicle including: an engine having a plurality of cylinders; an electric motor/generator; an output mechanism configured to transfer torque to a driving wheel; a differential mechanism configured to distribute torque from the engine to the electric motor/generator and the output mechanism; a lock mechanism configured to switch between a lock state that prevents rotation of the electric motor/generator and a release state that permits rotation of the electric motor/generator; and a controller configured to switch between a reduced-cylinder operation and an all-cylinder operation, at least one of the plurality of cylinders being deactivated and the remaining cylinders being activated in the reduced-cylinder operation, all the plurality of the cylinders being activated in the all-cylinder operation. The controller is configured to switch the lock mechanism from the release state to the lock state when temperature of the electric motor/generator is higher than a predetermined temperature. The controller is configured to set a first temperature as the predetermined temperature when the engine executes the reduced-cylinder operation. The controller is configured to set a second temperature lower than the first temperature as the predetermined temperature when the engine executes the all-cylinder operation.

Since during the reduced-cylinder operation, the engine is operated at lower torques than during the all-cylinder operation, the load on the electric motor/generator that receives reaction force from the engine is lower during the reduced-cylinder operation than during the all-cylinder operation. Therefore, the temperature rise rate of the electric motor/generator is faster during the all-cylinder operation than during the reduced-cylinder operation. In order to lock the electric motor/generator before the temperature of the electric motor/generator exceeds an acceptable limit related to overheating, the predetermined temperature for locking the electric motor/generator needs to be set to a lower temperature side of the acceptable limit, taking the temperature rise rate into account. If a single criterion temperature is set for both the all-cylinder operation and the reduced-cylinder operation so as to be more in accordance with the all-cylinder operation during which the temperature rise rate of the electric motor/generator is fast, the time margin given before the temperature of the electric motor/generator reaches the acceptable limit during the reduced-cylinder operation is excessively or inconveniently long. Therefore, during the reduced-cylinder operation there can occur an event that the electric motor/generator is locked when the electric motor/generator still has a capacity margin. When the electric motor/generator is locked, the engine rotation speed is restricted by vehicle speed, so that the engine cannot be controlled to an operation point of good thermal efficiency and therefore fuel economy will deteriorate. On the other hand, if a single criterion temperature is set for both the all-cylinder operation and the reduced-cylinder operation so as to be more in accordance with the reduced-cylinder operation during which the temperature rise rate of the electric motor/generator is slow, there is a possibility that during the all-cylinder operation, the timing of the locking may be later than appropriate for the temperature rise of the electric motor/generator, so that the temperature may reach or exceed the acceptable limit and the electric motor/generator may be overheated. When the electric motor/generator is overheated, demagnetization occurs, resulting in decreased electricity generation efficiency, and also causing a decline in the output torque transferred to the output portion so that drivability may deteriorate.

According to the control apparatus in the first aspect of the invention, in the case of the all-cylinder operation, the predetermined temperature for locking the electric motor/generator is set lower than in the case of the reduced-cylinder operation. That is, the predetermined temperature is set separately for the all-cylinder operation and the reduced-cylinder operation, in accordance with the respective temperature rise rates of the electric motor/generator during the two operations. Therefore, the overheating of the electric motor/generator can be properly restrained both during the all-cylinder operation and during the reduced-cylinder operation. Then, during the reduced-cylinder operation, it is possible to avoid an event that the electric motor/generator is locked when the electric motor/generator has a capacity margin and to control the engine to an operation point of good thermal efficiency during a period during which the locking thereof is appropriately avoided. Hence, it is possible to both restrain fuel economy deterioration and restrain the drivability deterioration caused by the overheating of an electric motor/generator.

The predetermined temperature for use during the reduced-cylinder operation and the criterion temperature for use during the all-cylinder operation may be set as appropriate. For example, in a construction of the control apparatus of the invention, a first temperature may be set as the predetermined temperature for use in the reduced-cylinder operation, and a second temperature that is smaller than the first value may be set as the predetermined temperature for use in the all-cylinder operation, each of the first temperature and the second temperature may be set with reference to a time margin from when the temperature of the electric motor/generator exceeds the predetermined temperature to when the temperature of the electric motor/generator reaches an acceptable limit, and the first temperature and the second temperature may be set so that the time margin in the all-cylinder operation and the time margin in the reduced-cylinder operation are substantially equal to each other. According to this construction, the time margins before the temperature of the electric motor/generator reaches the acceptable limit during the reduced-cylinder operation and during the all-cylinder operation are substantially equal to each other. Therefore, in terms of the protection with regard to heat production of the electric motor/generator, there is substantially no deviation between the all-cylinder operation and the reduced-cylinder operation.

As described above, according to the first aspect of the invention, since in the case of the all-cylinder operation, the criterion temperature for locking the electric motor/generator is set lower than in the case of the reduced-cylinder operation, it is possible to both restrain fuel economy deterioration and restrain the drivability deterioration caused by the overheating of the electric motor/generator.

A control method for a hybrid vehicle in a second aspect of the invention is a control method for a hybrid vehicle including an engine having a plurality of cylinders, an electric motor/generator, an output mechanism configured to transfer torque to a driving wheel, a differential mechanism configured to distribute torque from the engine to the electric motor/generator and the output portion, and a lock mechanism configured to switch between a lock state that prevents rotation of the electric motor/generator and a release state that permits rotation of the electric motor/generator. The control method includes: switching between a reduced-cylinder operation and an all-cylinder operation, at least one of the plurality of cylinders being deactivated and the remaining cylinders being activated in the reduced-cylinder operation, all the plurality of cylinders being activated in the all-cylinder operation; switching the lock mechanism from the release state to the lock state when temperature of the electric motor/generator is higher than a predetermined temperature; setting a first temperature as the predetermined temperature when the engine executes the reduced-cylinder operation; and setting a second temperature lower than the first temperature as the predetermined temperature when the engine executes the all-cylinder operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a flowchart showing an example of a control routine.

DETAILED DESCRIPTION OF EMBODIMENTS

Figure 1:
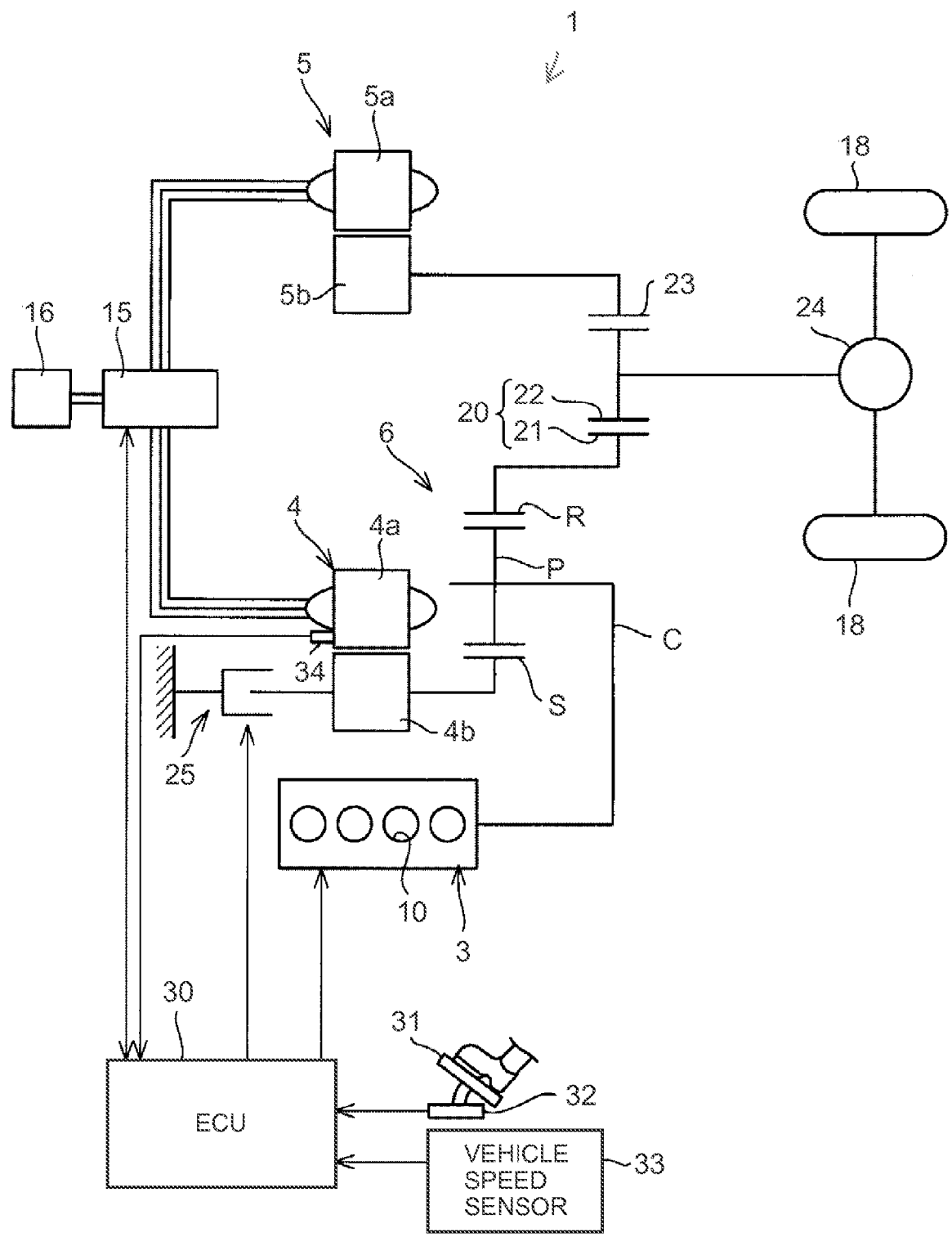
FIG. 1 is a diagram showing an overall construction of a vehicle to which a control apparatus of an embodiment of the invention is applied.

As shown in FIG. 1, a vehicle 1 is a constructed as a hybrid vehicle that has a combination of a plurality of motive power sources. The vehicle 1 has an engine 3 and two electric motor/generators 4 and 5 as vehicle propulsion power sources. The engine 3 is constructed as an in-line four-cylinder internal combustion engine having four cylinders 10. The engine 3 is capable of executing an all-cylinder operation in which all the four cylinders 10 are active and also a reduced-cylinder operation in which two of the four cylinders 10 are deactivated and the other two cylinders are active.

The engine 3 and the first electric motor/generator 4 are connected to a power splitting mechanism 6 that serves as a differential mechanism. The first electric motor/generator 4 has a stator 4a and a rotor 4b. The first electric motor/generator 4 functions as an electricity generator that generates electricity by receiving motive power from the engine 3 that is distributed via the power splitting mechanism 6, and also functions as an electric motor that is driven by alternating-current electric power. Likewise, the second electric motor/generator 5 has a stator 5a and a rotor 5b, and functions as an electric motor and an electricity generator. The electric motor/generators 4 and 5 are connected to a battery 16 via a motor control apparatus 15. The motor control apparatus 15 converts electric power generated by the electric motor/generators 4 and 5 into direct-current power and stores it into the battery 16, and converts electric power from the battery 16 into alternating-current power and supplies it to the electric motor/generators 4 and 5. The first electric motor/generator 4 corresponds to an electric motor/generator in accordance with an aspect of the invention.

The power splitting mechanism 6 is constructed as a single-pinion type planetary gear mechanism. The power splitting mechanism 6 has an externally-toothed sun gear S, an internally-toothed ring gear R disposed coaxially with the sun gear S, and a planetary carrier C that supports pinions P that mesh with the gears S and P in such a manner that the pinions P are rotatable about their own axes and revolvable about an axis of the sun gear S and the ring gear R. Engine torque that the engine 3 outputs is transferred to the planetary carrier C of the power splitting mechanism 6. The rotor 4b of the first electric motor/generator 4 is connected to the sun gear S of the power splitting mechanism 6. Torque output from the power splitting mechanism 6 via the ring gear R is transferred to an output gear train 20. The output gear train 20 functions as an output portion for transferring torque to driving wheels 18. The output gear train 20 includes an output drive gear 21 that rotates integrally with the ring gear R of the power splitting mechanism 6, and an output driven gear 22 that meshes with the output drive gear 21. The second electric motor/generator 5 is connected to the output driven gear 22 via a gear 23. The gear 23 rotates integrally with the rotor 5b of the second electric motor/generator 5. The torque output from the output driven gear 22 is distributed to the left and right driving wheels 18 via a differential apparatus 24.

The power splitting mechanism 6 is provided with a motor lock mechanism 25 as lock means. The motor lock mechanism 25 switches between a lock state that prevents rotation of the first electric motor/generator 4 and a release state that permits rotation of the first electric motor/generator 4. The motor lock mechanism 25 is constructed as a multiplate wet type brake mechanism. The switching of the motor lock mechanism 25 between the lock state and the release state is carried out by a hydraulic actuator (not shown). When the motor lock mechanism 25 is put into the lock state, rotation of the rotor 4b of the first electric motor/generator 4 is prevented. Due to this, rotation of the sun gear S of the power splitting mechanism 6 is also prevented. Therefore, distribution of torque of the engine 3 to the first electric motor/generator 4 is stopped, and the power splitting mechanism 6 enters a non-differential state.

Various portions of the vehicle 1 are controlled by an electronic control unit (ECU) 30 that is constructed as a computer. The ECU 30 performs various controls for the engine 3, the electric motor/generators 4 and 5, the motor lock mechanism 25, etc. Main controls that the ECU 30 performs in relation to the invention will be described below. Various pieces of information regarding the vehicle 1 are input to the ECU 30. For example, the rotation speeds and torques of the electric motor/generators 4 and 5 are input to the ECU 30 via the motor control apparatus 15. Furthermore, signals input to the ECU 30 include an output signal of an accelerator operation amount sensor 32 that produces a signal commensurate with the amount of depression of an accelerator pedal 31, an output signal of a vehicle speed sensor 33 that produces a signal commensurate with the vehicle speed of the vehicle 1, and an output signal of the temperature sensor 34 that produces a signal that corresponds to the temperature of the first electric motor/generator 4. The ECU 30 calculates a demanded drive torque that a driver demands, with reference to the output signal of the accelerator operation amount sensor 32 and the output signal of the vehicle speed sensor 33, and controls the vehicle 1 while switching among various modes so that the system efficiency with respect to the demanded drive torque becomes optimum. For example, in a low-load region in which the thermal efficiency of the engine 3 drops, the ECU 30 selects an EV mode in which the combustion in the engine 3 is stopped and the second electric motor/generator 5 is driven. Furthermore, in the case where the engine 3 alone cannot provide sufficient torque, the ECU 30 selects a hybrid mode in which the second electric motor/generator 5 is driven together with the engine 3 as vehicle drive sources. In this case; the demanded drive torque is output as a sum of the engine torque of the engine 3 and the motor torque of the second electric motor/generator 5. That is, the demanded drive torque Td is defined as Td=Te+Tm where Te is the engine torque and Tm is the motor torque.

When the hybrid mode is selected, the ECU 30 switches an operation mode between a differential operation mode in which, while the first electric motor/generator 4 has been unlocked, the first electric motor/generator 4 is caused to generate electricity by utilizing motive power of the engine 3 split by the power splitting mechanism 6 and a non-differential operation mode in which the first electric motor/generator 4 is locked via the motor lock mechanism 25 to stop distribution of motive power of the engine 3 to the first electric motor/generator 4 and cause the motive power of the engine 3 to be output to the output gear train 20, according to the circumstances.

Figure 2:
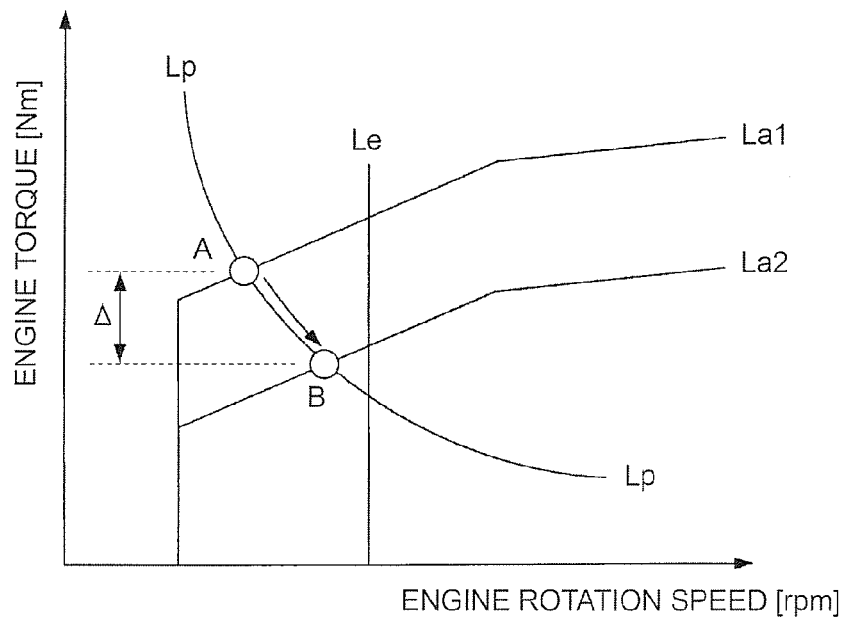
FIG. 2 is a diagram illustrating operation points of an engine in various operation modes.

As shown in FIG. 2, during the differential operation mode, the engine 3 is controlled by the ECU 30 so that the operation point defined by the engine rotation speed and the engine torque moves on a pre-set operation line La1 or a pre-set operation line La2. The operation line La1 has been set corresponding to the all-cylinder operation, and the operation line La2 has been set corresponding to the reduced-cylinder operation. Therefore, the ECU 30 controls the engine 3 and the first electric motor/generator 4 so that the operation point of the engine 3 moves on the operation line La1 during the all-cylinder operation, and so that the operation point of the engine 3 moves on the operation line La2 during the reduced-cylinder operation. If during the differential operation mode, the engine 3 is to be switched from the all-cylinder operation to the reduced-cylinder operation, the ECU 30 moves the operation point of the engine 3 from a point A on the operation line La1 to a point B on the operation line La2 along an equal power line Lp synchronously with the switching of the operation of the engine 3 as shown in FIG. 2. The operation lines La1 and La2 are determined beforehand by simulations or tests using actual engines and the like so that the fuel economy of the engine 3 is optimized and noise can be reduced. As is apparent from FIG. 2, the engine 3 is operated at a relatively low torque side during the reduced-cylinder operation in comparison with during the all-cylinder operation provided that the engine 3 produces the same power.

On the other hand, during the non-differential operation mode, the engine rotation speed and the vehicle speed have a one-to-one relation. Therefore, unlike during the differential operation mode, the operation point of the engine 3 cannot be controlled on the operation lines La1 and La2 without being restricted by the vehicle speed. Specifically, during the non-differential operation mode, it is impossible to change the engine rotation speed while maintaining a vehicle speed, and the operation point of the engine 3 is restricted on a straight line Le that is determined by the vehicle speed and that is parallel to the vertical axis of the graph shown in FIG. 2. During the non-differential operation mode, in comparison with the differential operation mode, the operation point of the engine 3 is almost always apart from the operation lines La1 and La2 both during the all-cylinder operation and during the reduced-cylinder operation, and therefore there is a tendency for thermal efficiency to deteriorate.

The switching from the differential operation mode to the non-differential operation mode by locking the first electric motor/generator 4 is performed, for example, for the purpose of restraining the temperature of the first electric motor/generator 4 from exceeding an acceptable limit. Besides, the switching from the differential mode to the non-differential mode is also sometimes performed, for example, in the case where it is necessary to avoid a so-called power circulation in which the rotation of the first electric motor/generator 4 is negative rotation when the differential operation mode is selected.

Figure 3:
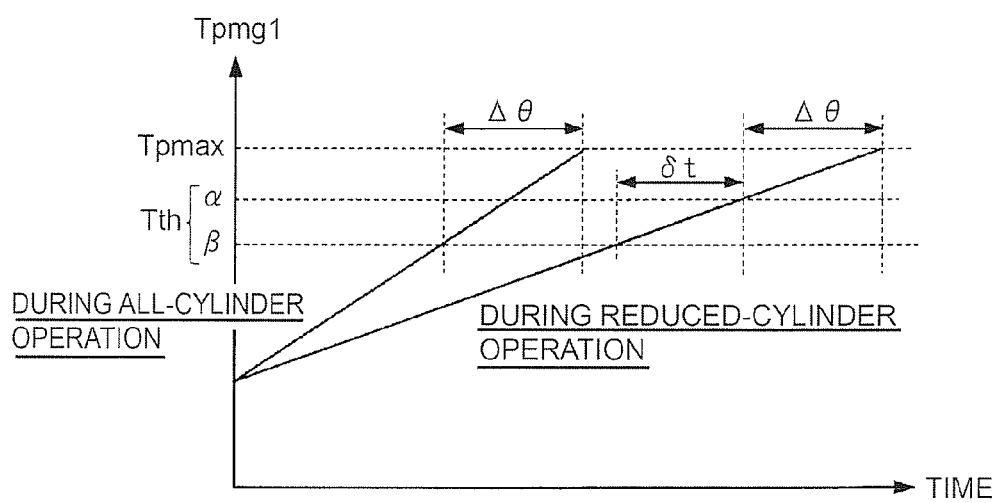
FIG. 3 is a diagram illustrating a setting method for a criterion temperature.

As stated above, during the reduced-cylinder operation, the engine 3 is operated at a relatively low torque side, in comparison with during the all-cylinder operation. Therefore, during the reduced-cylinder operation, the load on the first electric motor/generator 4, which receives reaction force of the engine 3, is lower than during the all-cylinder operation by an amount that corresponds to a difference Δ shown in FIG. 2. The temperature of the first electric motor/generator 4 correlates with the amount of heat produced during electric power generation or during power running, and the amount of heat production correlates with the load on the first electric motor/generator 4. Therefore, as shown in FIG. 3, during the all-cylinder operation, the temperature rise gradient of the temperature Tpmg1 of the first electric motor/generator 4, that is, the temperature rise rate, is higher than the temperature rise rate during the reduced-cylinder operation.

Therefore, in this embodiment, the criterion temperature for switching from the differential operation mode to the non-differential operation mode by locking the first electric motor/generator 4 is set in accordance with each of the temperature rise rate for the all-cylinder operation and the temperature rise rate during the reduced-cylinder operation. Concretely, α is set as a value of the criterion temperature Tth for use in the reduced-cylinder operation during which the temperature rise rate of the first electric motor/generator 4 is slow, and β (α>β) is set as a value of the criterion temperature Tth for use in the all-cylinder operation during which the temperature rise rate thereof is fast. As shown in FIG. 3, α and β are set with reference to a time margin Δθ from when the temperature Tpmg1 of the first electric motor/generator 4 exceeds the criterion temperature Tth to when the temperature Tpmg1 reaches an acceptable limit Tpmax. That is, α and β are set so that the time margin Δθ in the reduced-cylinder operation and the time margin Δθ in the all-cylinder operation are substantially equal. Incidentally, the acceptable limit Tpmax corresponds to a demagnetization temperature at which demagnetization of the first electric motor/generator 4 occurs due to overheating. Since α and β are set as values of the criterion temperature Tth in the foregoing method, there is no substantial deviation between the all-cylinder operation and the reduced-cylinder operation, in terms of the protection with regard to heat production of the first electric motor/generator 4. Then, in comparison with the case where the criterion temperature Th for the all-cylinder operation and the criterion temperature Th for the reduced-cylinder operation are set at the same value, for example, β, the foregoing setting avoids the locking of the first electric motor/generator 4 during a period δt during which the temperature Tpmg1 rises from β to α while the reduced-cylinder operation is being performed. That is, this embodiment makes it possible to perform the reduced-cylinder operation in the differential mode during a lock avoidance period that corresponds to the period δt, and therefore can restrain deterioration of fuel economy.

Next, with reference to FIG. 4, an example of a control routine that the ECU 30 performs will be described. A program of the control routine shown in FIG. 4 is retained in the ECU 30, and is read out at appropriate timing and is repeatedly executed at predetermined time intervals. In step S1, the ECU 30 obtains vehicle information regarding the vehicle 1, by referring to the foregoing various sensors and the like. Examples of pieces of vehicle information that the ECU 30 obtains include pieces of information regarding the accelerator operation amount of the vehicle 1, the vehicle speed, the engine rotation speed of the internal combustion engine 3, the rotation speeds and torques of the electric motor/generators 4 and 5. In step S2, the ECU 30 calculates a demanded drive torque on the basis of the accelerator operation amount and the vehicle speed. The demanded drive torque is calculated on the basis of a pre-set map. In step S3, the ECU 30 selects one of the all-cylinder operation and the reduced-cylinder operation as an operation mode of the engine 3 on the basis of the calculated demanded drive torque and other pieces of vehicle information. When the operation mode of the engine 3 has been determined, the ECU 30 reads out information regarding the operation lines prepared beforehand corresponding to the operation modes, and the like. In step S4, the ECU 30 obtains the temperature Tpmg1 of the first electric motor/generator 4 by referring to the output signal of the temperature sensor 34.

In step S5, the ECU 30 determines whether the operation mode selected in step S3 is the reduced-cylinder operation. If the selected operation mode is the reduced-cylinder operation, the process proceeds to step S6. If the selected operation mode is not the reduced-cylinder operation, that is, is the all-cylinder operation, the process proceeds to step S7. In step S6, the ECU 30 sets the value α for use during the reduced-cylinder operation as the criterion temperature Tth for determining whether to switch to the non-differential operation mode by locking the first electric motor/generator 4. On the other hand, in step S7, the ECU 30 sets the value β for use during the all-cylinder operation as the criterion temperature Tth. It is to be noted herein that α>β. The values α and β are set beforehand in the manner shown above with reference to FIG. 3, and are set in the ECU 30. The value α corresponds to a first value in accordance with an aspect of the invention, and the value β corresponds to a second value in accordance with the aspect of the invention.

In step S8, the ECU 30 determines whether the temperature Tpmg1 obtained in step S4 is greater than or equal to the criterion temperature Tth. If the temperature Tpmg1 is greater than or equal to the criterion temperature Tth, the process proceeds to step S9. In step S9, the ECU 30 sets the vehicle 1 to the non-differential mode. Specifically, if the present operation mode is the differential mode, the operation mode of the vehicle 1 is switched from the differential mode to the non-differential mode by changing the motor lock mechanism 25 from the release state to the lock state. If the present operation mode is the non-differential mode, the non-differential mode is maintained. In step S10, the ECU 30 calculates the motor torque of the second electric motor/generator 5 and the operation point of the engine 3 at the time of the non-differential mode, on the basis of the demanded drive torque calculated in step S2.

On the other hand, if the temperature Tpmg1 of the first electric motor/generator 4 is lower than the criterion temperature Tth, the process proceeds to step S11. In step S11, the ECU 30 sets the operation mode of the vehicle 1 to the differential mode. Specifically, if the present operation mode is the differential mode, the differential mode is maintained. If the present operation mode is the non-differential mode, the operation mode of the vehicle 1 is switched from the non-differential mode to the differential mode by changing the motor lock mechanism 25 from the lock state to the release state. In step S12, the ECU 30 calculates the motor torque of the second electric motor/generator 5 and the operation point of the engine 3 at the time of the differential mode, on the basis of the demanded drive torque calculated in step S2. Incidentally, although in this embodiment, the first electric motor/generator 4 is locked if the temperature Tpmg1 of the first electric motor/generator 4 is equal to the criterion temperature Tth (step S8 and step S9), this may be changed to a form in which the first electric motor/generator 4 is unlocked if the temperature Tpmg1 and the criterion temperature Tth are equal to each other. That is, it is permissible to lock the first electric motor/generator 4 only when the temperature Tpmg1 is higher than the criterion temperature Tth.

In step S13, the ECU 30 controls the engine 3 and the first electric motor/generator 4 so that the engine 3 is operated at the operation point calculated in step S10 or step S12. Substantially synchronously with this process, the ECU 30, in step S14, controls the second electric motor/generator 5 so that the second electric motor/generator 5 is operated at the motor torque calculated in step S10 or step S12. Then, the present routine is ended.

Since the ECU 30 executes the control routine shown in FIG. 4, the criterion temperature Th suitable for the all-cylinder operation and the criterion temperature Th suitable for the reduced-cylinder operation are set, and the locking and unlocking of the first electric motor/generator 4 is controlled on the basis of the thus-set criterion temperatures Th. Therefore, as described above, the overheating of the first electric motor/generator 4 can be properly restrained both during the all-cylinder operation and during the reduced-cylinder operation. Then, during the reduced-cylinder operation, it is possible to avoid an event that the first electric motor/generator 4 is locked when the first electric motor/generator 4 has a capacity margin. Due to this, it is possible to both restrain fuel economy deterioration and restrain the drivability deterioration caused by the overheating of an electric motor/generator.

The invention is not limited to the foregoing embodiment, but can be carried out in various forms within the scope of the gist of the invention. Although in the foregoing embodiment, the first electric motor/generator and the second electric motor/generator are provided, provision of two electric motor/generators is merely an example. The invention can be applied to any hybrid vehicle as long as the hybrid vehicle has an electric motor/generator that generates electricity by receiving reaction force from an engine and that is capable of being locked, regardless of the presence or absence of another electric motor/generator.

Although in the foregoing embodiment, the temperature of the electric motor/generator is determined by directly measuring it via the temperature sensor, it is also possible to indirectly determine the temperature of the electric motor/generator by calculation on the basis of one or more parameters that correlate with the temperature of the electric motor/generator.

What is claimed is:

1. A hybrid vehicle comprising:
    an engine having a plurality of cylinders;
    an electric motor/generator;
    an output mechanism configured to transfer torque to a driving wheel;
    a differential mechanism configured to distribute torque from the engine to the electric motor/generator and the output mechanism;
    a lock mechanism configured to switch between a lock state that prevents rotation of the electric motor/generator and a release state that permits rotation of the electric motor/generator; and
    a controller configured to switch between a reduced-cylinder operation and an all-cylinder operation, at least one of the plurality of cylinders being deactivated and the remaining cylinders being activated in the reduced-cylinder operation, all the plurality of cylinders being activated in the all-cylinder operation,
    the controller being configured to switch the lock mechanism from the release state to the lock state when a temperature of the electric motor/generator is higher than a predetermined temperature,
    the controller being configured to set a first temperature as the predetermined temperature when the engine executes the reduced-cylinder operation, and
    the controller being configured to set a second temperature lower than the first temperature as the predetermined temperature when the engine executes the all-cylinder operation.

2. The hybrid vehicle according to claim 1, wherein each of the first temperature and the second temperature is set based on a time margin from when the temperature of the electric motor/generator exceeds the predetermined temperature to when the temperature of the electric motor/generator reaches an acceptable limit, and the first temperature and the second temperature are set so that the time margin in the all-cylinder operation and the time margin in the reduced-cylinder operation are substantially equal to each other.

3. A control method for a hybrid vehicle including an engine having a plurality of cylinders, an electric motor/generator, an output mechanism configured to transfer torque to a driving wheel, a differential mechanism configured to distribute torque from the engine to the electric motor/generator and the output mechanism, and a lock mechanism configured to switch between a lock state that prevents rotation of the electric motor/generator and a release state that permits rotation of the electric motor/generator, the control method comprising:
    switching between a reduced-cylinder operation and an all-cylinder operation, at least one of the plurality of cylinders being deactivated and the remaining cylinders being activated in the reduced-cylinder operation, all the plurality of cylinders being activated in the all-cylinder operation;
    switching the lock mechanism from the release state to the lock state when a temperature of the electric motor/generator is higher than a predetermined temperature;
    setting a first temperature as the predetermined temperature when the engine executes the reduced-cylinder operation; and
    setting a second temperature lower than the first temperature as the predetermined temperature when the engine executes the all-cylinder operation.

* * * * *